(12) United States Patent
Tanaka et al.

(10) Patent No.: US 10,414,640 B2
(45) Date of Patent: Sep. 17, 2019

(54) FORKLIFT

(71) Applicant: KABUSHIKI KAISHA TOYOTA JIDOSHOKKI, Kariya-shi, Aichi (JP)

(72) Inventors: Minoru Tanaka, Nagakute (JP); Akinobu Fujii, Nagakute (JP); Mitsuo Koide, Nagakute (JP); Yuuji Tsusaka, Nagakute (JP); Makoto Ichinose, Kariya (JP); Makoto Hayakawa, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 0 days.

(21) Appl. No.: 15/566,463

(22) PCT Filed: Apr. 8, 2016

(86) PCT No.: PCT/JP2016/061599
§ 371 (c)(1),
(2) Date: Oct. 13, 2017

(87) PCT Pub. No.: WO2016/167200
PCT Pub. Date: Oct. 20, 2016

(65) Prior Publication Data
US 2018/0134531 A1 May 17, 2018

(30) Foreign Application Priority Data
Apr. 16, 2015 (JP) .................................. 2015-084522

(51) Int. Cl.
*B66F 9/075* (2006.01)
*B66F 9/24* (2006.01)
(Continued)

(52) U.S. Cl.
CPC ............ *B66F 9/0755* (2013.01); *B66F 9/063* (2013.01); *B66F 9/16* (2013.01); *B66F 9/24* (2013.01);
(Continued)

(58) Field of Classification Search
CPC ............ B66F 9/0755; B66F 9/16; B66F 9/24
See application file for complete search history.

(56) References Cited

U.S. PATENT DOCUMENTS

2007/0269299 A1  11/2007  Ross et al.
2008/0011554 A1 * 1/2008  Broesel ................. B66F 9/0755
                                                              187/224

(Continued)

FOREIGN PATENT DOCUMENTS

BE     1018160 A3     6/2010
EP     1 995 188 B1   8/2011
(Continued)

OTHER PUBLICATIONS

International Search Report for PCT/JP2016/061599 dated Jun. 14, 2016 [PCT/ISA/210].

(Continued)

*Primary Examiner* — Imran K Mustafa
(74) *Attorney, Agent, or Firm* — Sughrue Mion, PLLC

(57) ABSTRACT

A forklift includes a vehicle body 30, a fork 22 mounted on the vehicle body, a controller configured to adjust a position and an orientation of the vehicle body, a laser sensor 20 configured to measure distance data from the laser sensor to an object existing in a space set forward of the fork, and a control commander configured to, when the distance data measured by the laser sensor includes a load or a pallet 100 to be lifted, generate track data for moving the vehicle body (Continued)

to a loading position of the load or the pallet based on the distance data, and provide a command to the controller using the generated track data.

5 Claims, 11 Drawing Sheets

(51) Int. Cl.
    *G01B 11/26* (2006.01)
    *G01B 11/00* (2006.01)
    *B66F 9/16* (2006.01)
    *G01S 17/08* (2006.01)
    *G05D 1/02* (2006.01)
    *B66F 9/06* (2006.01)
    *G01B 11/02* (2006.01)
(52) U.S. Cl.
    CPC ............ *G01B 11/00* (2013.01); *G01B 11/002* (2013.01); *G01B 11/02* (2013.01); *G01B 11/26* (2013.01); *G01S 17/08* (2013.01); *G05D 1/024* (2013.01); *G05D 1/0225* (2013.01); *G05D 1/0231* (2013.01); *G05D 2201/0216* (2013.01)

(56) References Cited

U.S. PATENT DOCUMENTS

| 2011/0218670 | A1 | 9/2011 | Bell et al. |
| 2014/0277691 | A1* | 9/2014 | Jacobus ............... G06Q 10/087 700/216 |

FOREIGN PATENT DOCUMENTS

| JM | 5-39199 A | 2/1993 |
| JP | 59-57898 A | 4/1984 |
| JP | 2-79398 U | 6/1990 |
| JP | 11-278799 A | 10/1999 |
| JP | 2005-89013 A | 4/2005 |
| JP | 2010-189130 A | 9/2010 |
| KR | 10-2013-0099596 A | 9/2013 |
| WO | 2011/108944 A2 | 9/2011 |

OTHER PUBLICATIONS

Communication dated Mar. 1, 2018 from the European Patent Office in counterpart Application No. 16779991.5.
International Preliminary Report on Patentability and Translation of Written Opinion dated Oct. 17, 2017 from the International Searching Authority in counterpart International Application No. PCT/JP2016/061599.

* cited by examiner

Straight Line Extracted from Observation Point Group

FORKLIFT

CROSS REFERENCE TO RELATED APPLICATIONS

This application is a National Stage of International Application No. PCT/JP2016/061599, filed on Apr. 8, 2016, which claims priority from Japanese Patent Application No. 2015-084522, filed on Apr. 16, 2015, the contents of all of which are incorporated herein by reference in their entirety.

TECHNICAL FIELD

The present application claims priority based on Japanese Patent Application No. 2015-084522 filed on Apr. 16, 2015, the contents of which are hereby incorporated by reference into the present application. The technique disclosed herein relates to a forklift.

BACKGROUND

In a load-lifting operation using a forklift, interferences between a fork and a load or a pallet to be lifted need to be avoided. In a forklift described in Japanese Patent Application Publication No. 2005-89013, a reflective optical sensor detects upper and lower ends of an opening of a pallet. Then, a clearance between an upper surface of a fork and the upper end of the opening of the pallet and a clearance between a lower surface of the fork and the lower end of the opening of the pallet are calculated, and a fork position is adjusted so that these clearances take appropriate values.

SUMMARY

To perform an accurate load-lifting operation with a forklift, the forklift needs to be moved accurately to a loading position of a load or a pallet to be lifted. However, the conventional technique in some cases had been unable to accurately position the forklift at the loading position of the load or the pallet to be lifted. For example, in the technique of Japanese Patent Application Publication No. 2005-89013, although a heightwise displacement of the pallet can be detected, a lateral displacement and a displacement regarding an orientation of the pallet cannot be detected. Due to this, there had been cases in which the forklift could not be positioned accurately at the loading position of the pallet.

The present description discloses a forklift that enables an accurate loading operation.

A forklift disclosed herein may comprise a vehicle body a fork mounted on the vehicle body, a controller configured to adjust a position and an orientation of the vehicle body, a laser sensor configured to measure distance data from the laser sensor to an object existing in a space set forward of the fork, and a control commander configured to, when the distance data measured by the laser sensor includes a load or a pallet to be lifted, generate track data for moving the vehicle body to a loading position of the load or the pallet based on the distance data; and provide a command to the controller using the generated track data.

The aforementioned forklift is provided with the laser sensor configured to measure the distance data from the laser sensor to the object existing in the space set forward of the fork. As such, in addition to a heightwise displacement of the load or the pallet to be lifted, a lateral displacement and a displacement regarding an orientation of the load or the pallet can be detected. Further, when the load or the pallet to be lifted is included in the distance data measured by the laser sensor, the track data is generated from the distance data for moving the vehicle body to the loading position of the load or the pallet, and the vehicle body is moved using the generated track data. Due to this, the forklift can accurately be positioned at the loading position of the load or the pallet.

DETAILED DESCRIPTION

Figure 1:
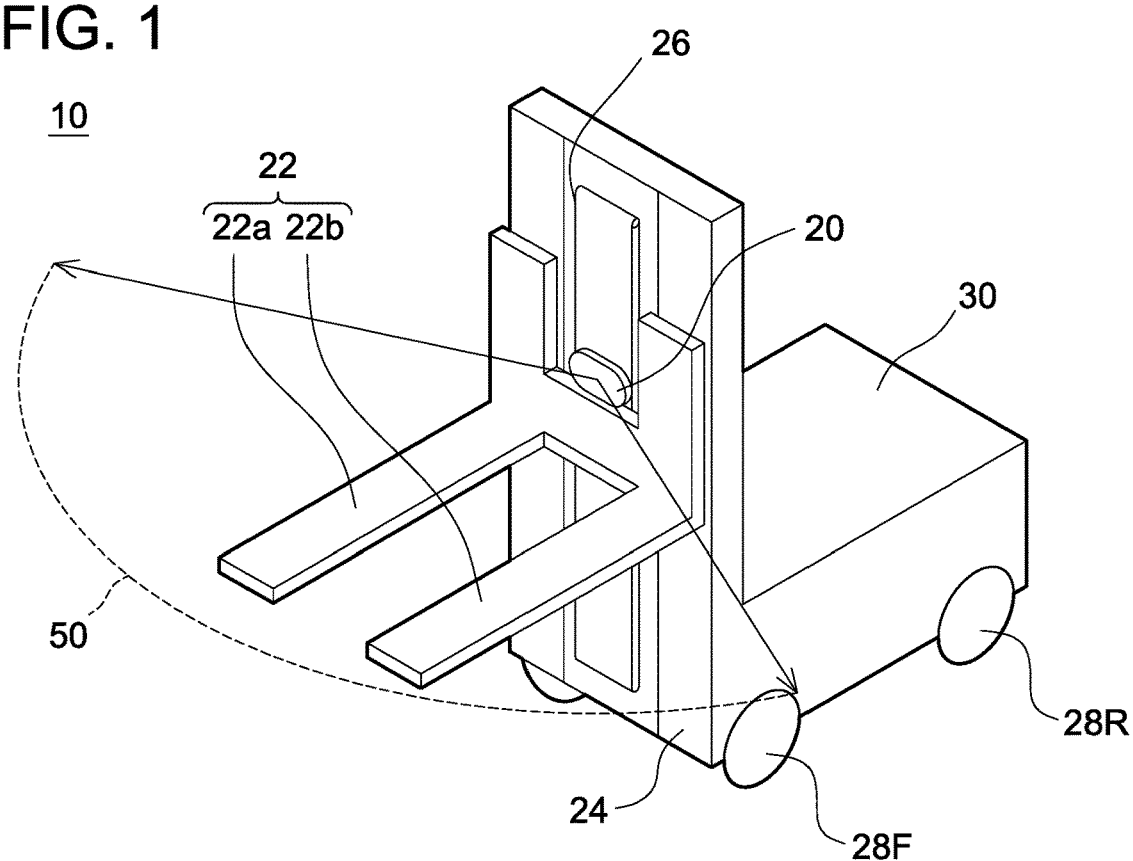
FIG. 1 is a perspective view showing a schematic configuration of a forklift of an embodiment.

Some of the features of embodiments described below will be listed. It should be noted that the respective technical features described below are independent of one another, and useful solely or in combinations. The combinations thereof are not limited to those described in the claims as originally filed.

(Feature 1) In a forklift disclosed herein, when distance data measured by a laser sensor includes a pallet, a control commander may be configured to identify a position and an orientation of the pallet based on the distance data, and generate track data based on the identified position and orientation of the pallet. According to such a configuration, a vehicle body can accurately be moved to a loading position based on the generated track data.

(Feature 2) In a forklift disclosed herein, the laser sensor may be configured to measure a distance from the laser sensor to an object in a scanning plane by scanning laser light in a first direction. Further, the laser sensor may be mounted on a fork and may be configured to measure three-dimensional distance data from the laser sensor to the object existing in a space set forward of the fork by using a motion of the fork in a direction which is different from the first direction. According to such a configuration, two-dimensional scan is enabled even by using a one-dimensional scan type laser sensor, and the three-dimensional distance data of the object located around the forklift can be acquired.

(Feature 3) A forklift disclosed herein may further include a lift mechanism configured to move the fork up and down with respect to the vehicle body, and the laser sensor may be configured to measure the three-dimensional distance data from the laser sensor to the object existing in the space set forward of the fork by using an up and down motion of the fork. According to such a configuration, the laser light emitted from the laser sensor can be scanned in an up and down direction that intersects with the first direction by using the lift mechanism which lifts and lowers the fork in the up and down direction. Due to this, the laser light emitted from the laser sensor can be scanned two-dimensionally, and the three-dimensional distance data of the object located around the forklift can be acquired.

(Feature 4) A forklift disclosed herein may further include a tilting mechanism configured to tilt the fork with respect to the vehicle body, and the laser sensor may be configured to measure the three-dimensional distance data from the laser sensor to the object existing in the space set forward of the fork by using a tilting motion of the fork. According to such a configuration, the laser light emitted from the laser sensor can be scanned in the up and down direction by using the tilting mechanism which tilts the fork. Due to this, the laser light emitted from the laser sensor can be scanned two-dimensionally (for example, two-dimensionally along a horizontal direction and the up and the up and down direction), and the three-dimensional distance data of the object located around the forklift can be acquired.

(Feature 5) In a forklift disclosed herein, the laser sensor may be disposed above a lower surface of the fork. According to such a configuration, the laser sensor can be prevented from breaking even if the fork touches a floor or a ground.

(Feature 6) In a forklift disclosed herein, the laser sensor may be mounted on the fork with a depression angle with respect to a horizontal direction so that the laser light emitted from the laser sensor is emitted obliquely downward. According to such a configuration, the pallet placed on the floor can be identified even in a case where the laser sensor is disposed above the fork.

(Feature 7) In a forklift disclosed herein, when the three-dimensional distance data measured by the laser sensor includes the load or the pallet to be lifted, the control commander may be configured to control a motion of the fork so that the laser light emitted from the laser sensor is emitted to a heightwise center of a front surface of the load or the pallet while the vehicle body is moved to the loading position of the load or the pallet based on the three-dimensional distance data. According to such a configuration, the load or the pallet can be observed while moving the vehicle body, and the forklift can accurately be moved to the loading position.

First Embodiment

With reference to the drawings, a forklift 10 of the present embodiment will be described. As shown in FIG. 1, the forklift 10 is an unmanned forklift, and includes a vehicle body 30, a mast 24, a fork 22, a lift chain 26, a laser sensor 20, and a controller 70.

The vehicle body 30 is provided with a front wheel 28F and a rear wheel 28R at each of its lateral surfaces. One of the rear wheels 28R is connected to a wheel driving motor 90 (shown in FIG. 3) via a driving mechanism that is not shown, and is configured to be driven to rotate by the wheel driving motor 90. Further, the rear wheel 28R connected to the wheel driving motor 90 is also connected to a steering device 94 (shown in FIG. 3), and an orientation of the wheel is adjusted by the steering device 94. The other of the rear wheel 28R is a caster wheel, and is rotated and steered by following motions of the vehicle body 30. The controller 70 controls the wheel driving motor 90 and the steering device 94 to allow the vehicle body 30 to run on a road and to change a moving direction of the vehicle body 30.

The mast 24 is a post mounted to a front surface of the vehicle body 30, and its axis extends in an up and down direction. The fork 22 is mounted to the mast 24 by being able to move in the up and down direction. Further, the fork 22 is configured capable of swinging with respect to the mast 24 by a tilting mechanism that is not shown. The fork 22 includes a pair of tines 22a, 22b. The tines 22a, 22b are disposed at positions spaced apart from each other in a right-and-left direction of the vehicle body 30, and extend forward of the vehicle body 30 from a mast 24 side. The lift chain 26 is disposed on the mast 24, and is engaged with the fork 22. When the lift chain 26 is driven by a fork lifting device 48 (shown in FIG. 3), the fork 22 is lifted and lowered according to a motion thereof. A position of the fork 22 in the up and down direction can be identified by a driving amount of the fork lifting device 48.

Figure 2:
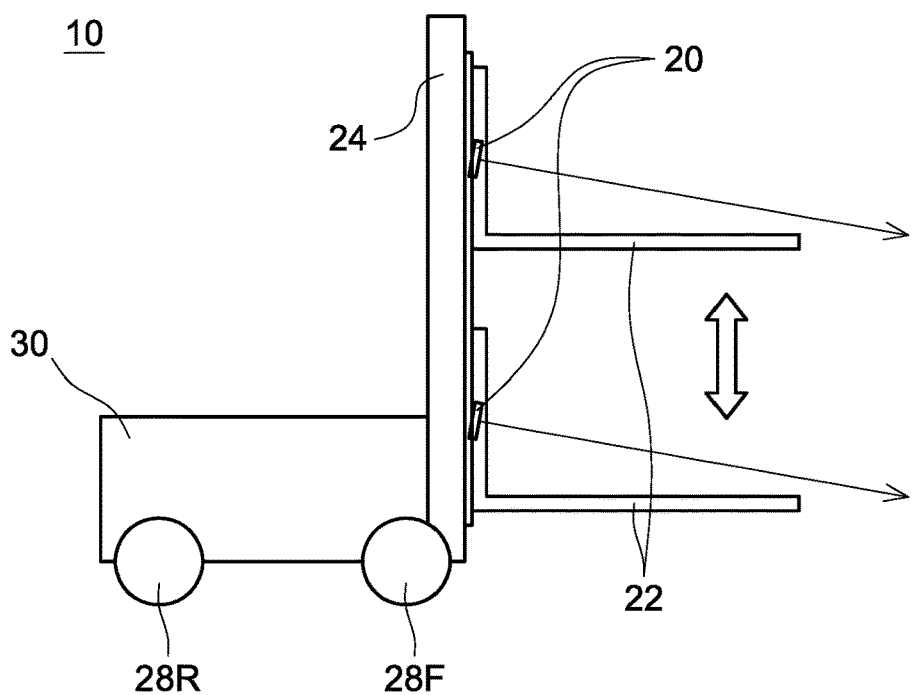
FIG. 2 is a diagram schematically showing a state in which laser light is scanned by the forklift of the embodiment.

The laser sensor 20 is mounted to the fork 22, and is lifted and lowered in the up and down direction together with the fork 22. A position to which the laser sensor 20 is mounted is between the tine 22a and the tine 22b, and on a backward side (on a vehicle body 30 side) relative to a backrest surface of the fork 22. The laser sensor 20 is disposed above lower surfaces of the tines 22a, 22b. The laser sensor 20 is mounted to the fork 22 with a depression angle with respect to a horizontal direction so that the laser light emitted therefrom will be emitted obliquely downward. The laser sensor 20 is a one-dimensional scanning-type laser sensor that scans the laser light in one direction (the horizontal direction in the present embodiment). The laser sensor 20 emits the laser light, and measures a distance to its peripheral object using reflection of the emitted laser light. Since the laser sensor 20 moves up and down according to an up and down motion of the fork 22, a heightwise position of the laser light emitted from the laser sensor 20 changes according to the motion. In the present embodiment, as shown in FIG. 2, the laser sensor 20 emits the laser light to a region 50 (see FIG. 1) having a predetermined angular range and set forward of the forklift 10, while lifting and lowering in the up and down direction. Due to this, the laser light emitted from the laser sensor 20 is scanned in the horizontal direction and in a height direction (two-dimensionally), and distance data 80 of a range set forward of the forklift 10 is thereby acquired. Three-dimensional distance data acquired by the laser sensor 20 is inputted into the controller 70 (see FIG. 3).

It should be noted that, UTM-30LX made by HOKUYO AUTOMATIC CO. LTD, LMS100 made by SICK AG, or the like may for example be used as the laser sensor 20.

The controller 70 is constituted of a microprocessor provided with a CPU and the like. The controller 70 is installed in the vehicle body 30. The controller 70 is connected to the laser sensor 20, the wheel driving motor 90 that drives the one of the rear wheels 28R, the steering device 94 that adjusts the steering angle of the e one of the rear wheels 28R, the fork lifting device 48 that lifts and lowers the fork 22, and the like as aforementioned, and controls operations thereof.

That is, the controller 70 controls a running direction and a running speed of the forklift 10 by driving the wheel driving motor 90 and the steering device 94. Specifically, the controller 70 drives the one of the rear wheels 28R by outputting a control command value to the wheel driving motor 90 and the steering device 94. Thereby, the running direction, the running speed, and a running path of the forklift 10 are controlled. The controller 70 can identify an actual position and speed of the forklift 10 according to the steering angle of the one of the rear wheels 28R achieved by the steering device 94 and a rotation speed based on a signal from the wheel driving motor 90. It should be noted that, since the control of the running direction and the running speed of the forklift 10 by the controller 70 can be performed by conventionally known methods, and hence the detailed description thereof will be omitted.

Figure 3:
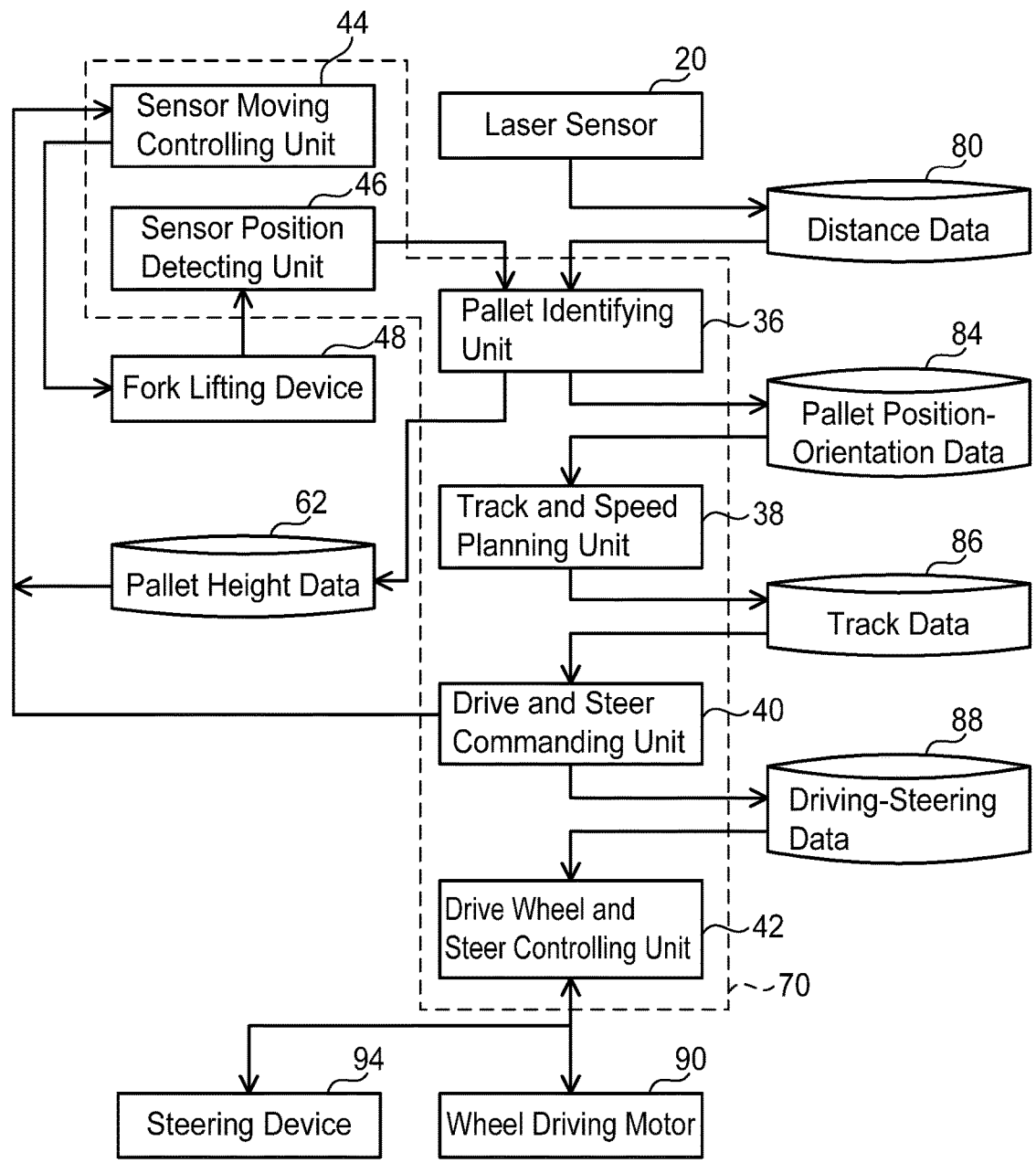
FIG. 3 is a block diagram showing a control system of the forklift of the embodiment.

Further, the controller 70 identifies a pallet 100 using the laser sensor 20 and executes processes to move the forklift 10 to a position for loading the identified pallet 100 by executing a program stored in the memory. Specifically, at an initial observation state of the pallet 100 to be lifted, the controller 70 firstly executes a process to lower the laser sensor 20 while detecting a heightwise position of the laser sensor 20, and to identify a height of a center of a front surface of the pallet 100 based on distance data acquired by the laser sensor 20. Then, the controller 70 identifies a position and orientation of the pallet 100 based on distance data measured around the height of the center of the front surface of the identified pallet 100. Next, a process to generate track data based on which the vehicle body is to run is executed based on the position and orientation of the identified pallet 100. Then, a process to generate driving-steering data is executed based on the generated track data and the position and orientation of the pallet 100, and finally, a process to drive the vehicle body based on the generated driving-steering data is executed. That is, as shown in FIG. 3, the controller 70 functions as a pallet identifying unit 36, a track and speed planning unit 38, a drive and steer commanding unit 40, a drive wheel and steer controlling unit 42, a sensor moving controlling unit 44, and a sensor position detecting unit 46. The position, orientation, and width of the pallet 100 are identified, and the vehicle body 30 moves to a loading position based on the position and orientation of the identified pallet 100 by the controller 70 functioning as the aforementioned respective units 32 to 46. Details of the respective units 32 to 46 will be described together with processes executed by the controller 70 described later.

Figure 4:
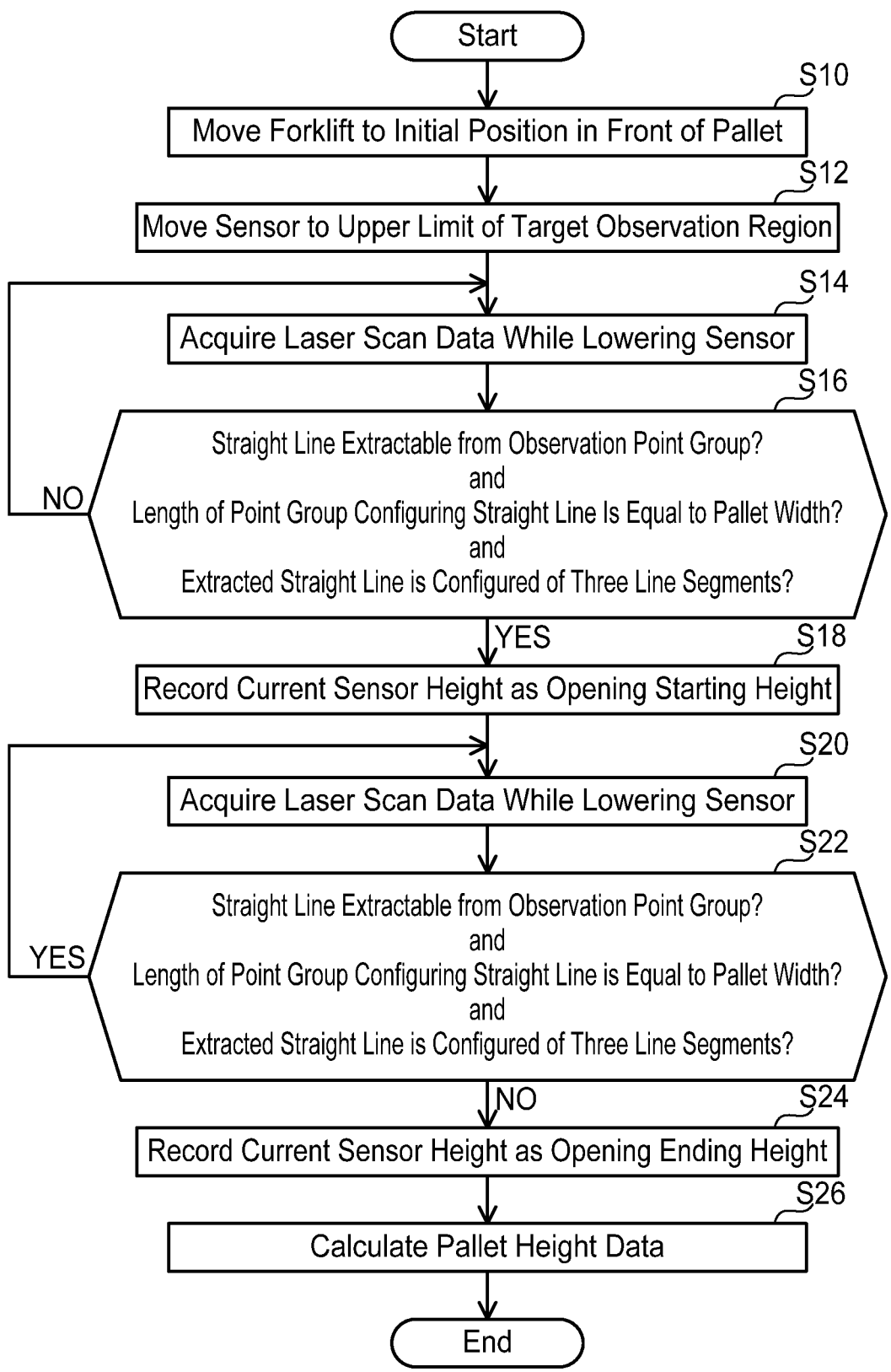
FIG. 4 is a flowchart showing procedures of a process of acquiring height data of a pallet using a laser sensor at an initial position.

Next, a process by the controller 70 to move the forklift 10 to the loading position of the pallet 100 will be described. Firstly, a process to acquire distance data 80 of the pallet 100 to be lifted and to identify a height and a width of the pallet 100 from this distance data will be described. The distance data acquisition is performed in a state where the forklift 10 is in standby in a vicinity of the pallet 100 to be lifted. That is, as shown in FIG. 4, the controller 70 firstly drives one of the rear wheels 28R and move the forklift 10 to approach the pallet 100 so that the pallet 100 is located in front of the vehicle body 30. That is, the forklift 10 is moved to an initial position in front of the pallet to observe the pallet 100 using the laser sensor 20 (S10). For example, the forklift 10 that conveys loads within a factory has preset positions for lifting the loads (the pallet 100). Due to this, the initial position for the forklift 10 to be in standby is preset with respect to the position where the pallet 100 is to be lifted. Due to this, the controller 70 drives the wheel driving motor 90 and the steering device 94 to the preset initial position to allow the forklift 10 to move autonomously thereto. It should be noted that, in a case where the forklift 10 is to be driven by a driver personnel, the forklift 10 may be moved to the initial position by the driver personnel, and thereafter a distance data generating process may be started by a switch operation by the driver personnel on the forklift 10.

Figure 5:
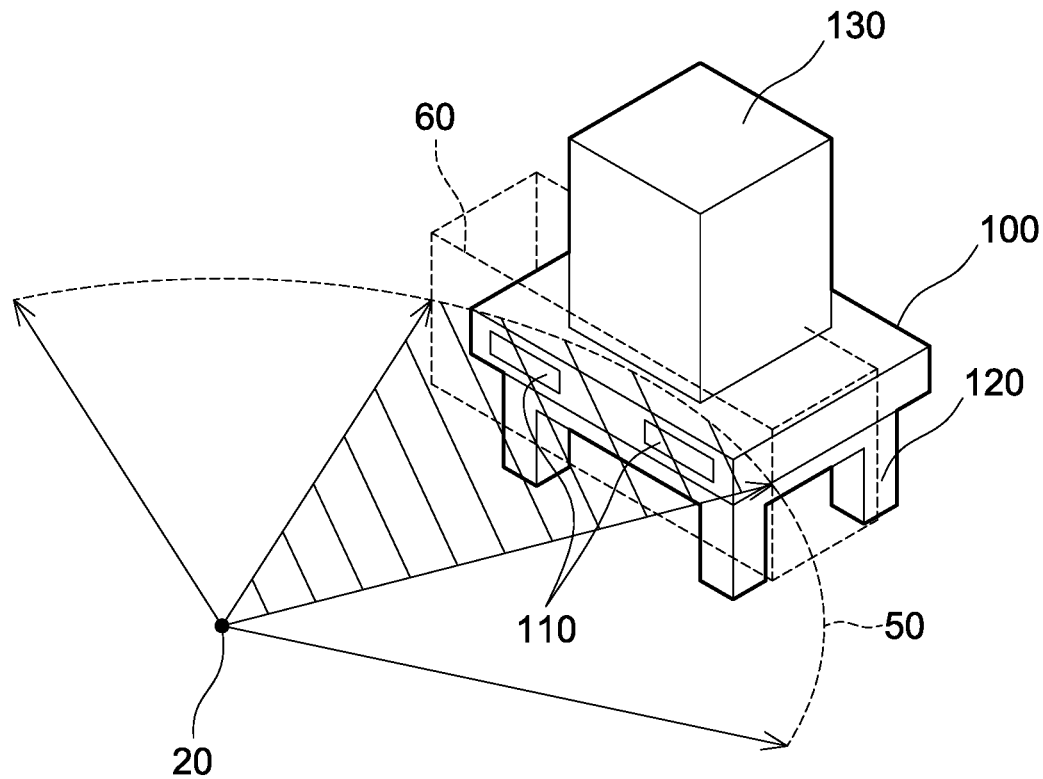
FIG. 5 is a diagram showing a state in which distance data from the laser sensor to the pallet is being acquired by the laser sensor.

Next, the controller 70 drives the fork lifting device 48 so that the laser sensor 20 is moved to have its laser light emitted to an upper limit of a target observation region 60 (shown in FIG. 5) (S12). The target observation region 60 is a region where the pallet 100 may be existing. For example, as shown in FIG. 5, in a case where a package 130 is mounted on the pallet 100, and the pallet 100 is mounted on a stage 120, the region where the pallet 100 may be existing (height and width thereof) is determined by sizes of the stage 120 and the pallet 100. In step S12, the laser sensor 20 is moved to the upper limit of the region where the pallet 100 may be existing, so that the pallet 100 can surely be detected.

Next, the controller 70 acquires scan data using the laser sensor 20 while driving the fork lifting device 48 and lowering the fork 22 (S14). That is, the laser sensor 20 scans and emits the laser light along the horizontal direction, while at the same time detects reflection of the emitted laser light. On the other hand, since the fork lifting device 48 lowers the fork 22, the laser sensor 20 moves downward. Due to this, the laser light emitted from the laser sensor 20 is scanned in a vertical direction as well. Accordingly, in the process of step S14, the laser light from the laser sensor 20 is scanned in both the horizontal and vertical directions, and detection of the reflections thereof allows an acquisition of observation point groups in the target observation region 60. It should be noted that, a function of the controller 70 realized by the aforementioned processes of steps S12 and S14 corresponds to the sensor moving controlling unit 44 shown in FIG. 3.

Next, the controller 70 performs a process of step S16 sequentially on each observation point group acquired by the laser sensor 20. Specifically, the controller 70 firstly determines whether or not a straight line can be extracted from this observation point group. As shown in FIG. 5, the observation point group generated from a reflection that reflected on the front surface of the pallet 100 is positioned within a same plane. Due to this, the observation point group generated from this reflection that reflected on the front surface of the pallet 100 configures a straight line. It should be noted that, the extraction of such straight lines can be performed using well-known algorithms called robust estimation, such as RANSAC.

Next, the controller 70 determines whether or not a length of the point group configuring the extracted straight line is substantially equal to the width of the pallet 100. Here, a standard of the pallet 100 is normally known in advance. Thus, a determination can be made on whether or not the straight line on the front surface of the pallet 100 is being extracted by comparing the length of the point group configuring the extracted straight line and a preset value (a value set from the standard of the pallet 100). A length $W_p$ of the point group configuring the extracted straight line may be obtained by using observation points having maximal value $p_{xmax}$ and minimal value $p_{xmin}$ along an x direction and maximal value $p_{ymax}$ and minimal value $p_{ymin}$ along a y direction within the point group as for example shown in FIG. 6, by using the following formula.

[Math 1]

$$W_p = \sqrt{(\rho_{xmax} - \rho_{xmin})^2 + (\rho_{ymax} - \rho_{ymin})^2} \quad (1)$$

The controller 70 determines whether or not the length obtained by the math formula (1) is equal to the width of the pallet 100 by comparing it with the width of the pallet 100 (preset value).

Figure 7:
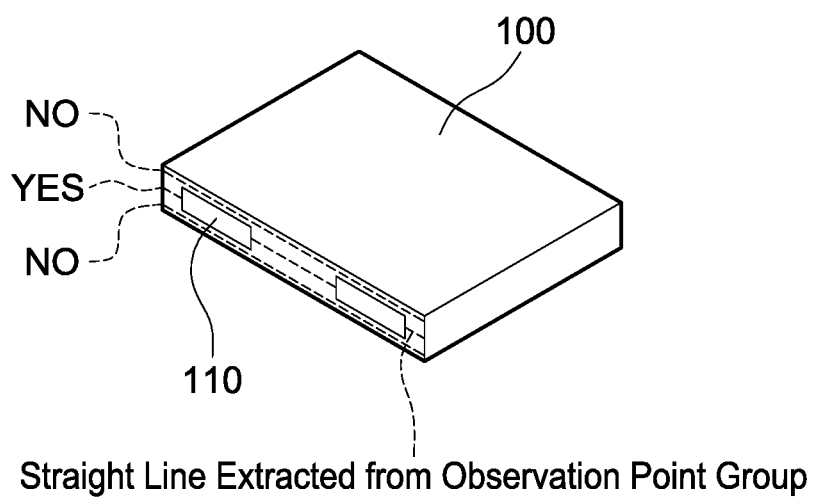
FIG. 7 is a diagram for explaining a method of detecting openings of the pallet.

Next, the controller 70 determines whether or not the extracted straight line is configured of three line segments. Specifically, the extracted straight line is clustered using Euclidean distance. That is, as shown in FIGS. 5 and 7, the front surface of the pallet 100 includes two openings 110 (into which the tines 22a, 22b of the fork 22 are to be inserted). Due to this, the straight line to be extracted from the front surface of the pallet 100 is divided by the openings 110 in the front surface of the pallet 100. Thus, when the measuring height of the laser sensor 20 is within the range of the openings 110 of the pallet, the extracted straight line is clustered by three line segments (that is, a cluster number thereof becomes three (line segments to which a determination of YES was made in FIG. 7)). It should be noted that, for this clustering, well-known methods such as k-means method or kd-tree method may be used.

Here, the controller 70 moves the fork 22 up and down by controlling the fork lifting device 48, and as such, it is capable of identifying the position of the fork 22 in the up and down direction. Since the laser sensor 20 is mounted on the fork 22, the controller 70 (the sensor position detecting unit 46 shown in FIG. 3) is capable of identifying the heightwise position of the laser sensor 20. Due to this, if all the conditions in the process of step S16 as aforementioned are met (YES to S16), the controller 70 determines that the current measuring height of the laser sensor 20 is a starting height ($h_A$) of the openings 110 of the pallet, and records the current measuring height (S18). In step S16, if one or more of the conditions are not met (NO to S16), the controller 70 returns to the process of step S14.

Next, the controller 70 drives the fork lifting device 48 again to acquire scan data using the laser sensor 20 while lowering the fork 22 (S20). Then, the controller 70 performs a process of step S22 sequentially on each observation point group acquired by the laser sensor 20. Since the process of S22 is same as the process of step S16, the detailed description thereof will be omitted. In the process of step S22, if one or more of the conditions are not met (NO to S22), the controller 70 determines that a current measuring height of the laser sensor 20 is an ending height ($h_B$) of the openings 110 of the pallet 100, and records the current measuring height (S24). If all the conditions in the process of step S22 are met (YES to S22), the height where the laser light is scanned is determined as a height where the openings 110 of the pallet 100 exist, and the controller 70 returns to the process of step S20. It should be noted that, in the processes of steps S16 and S22 as above, a function of the controller 70 for identifying the height of the laser sensor 20 corresponds to the sensor position detecting unit 46 shown in FIG. 3.

Next, the controller 70 calculates a center height hr of the pallet 100 and a width $H_p$ of the openings 110 of the pallet in the up and down direction (pallet height data 62) using the following math formulas (2) and (3) based on $h_A$ and $h_B$ obtained by performing the processes of steps S16 and S22 as aforementioned (S26). It should be noted that, a function of the controller 70 realized by steps S10 to S24 as above corresponds to the pallet identifying unit 36 shown in FIG. 3.

[Math 2]

$$h_p = \frac{h_A + h_B}{2} \quad (2)$$

$$H_p = h_A - h_B \quad (3)$$

Figure 8:
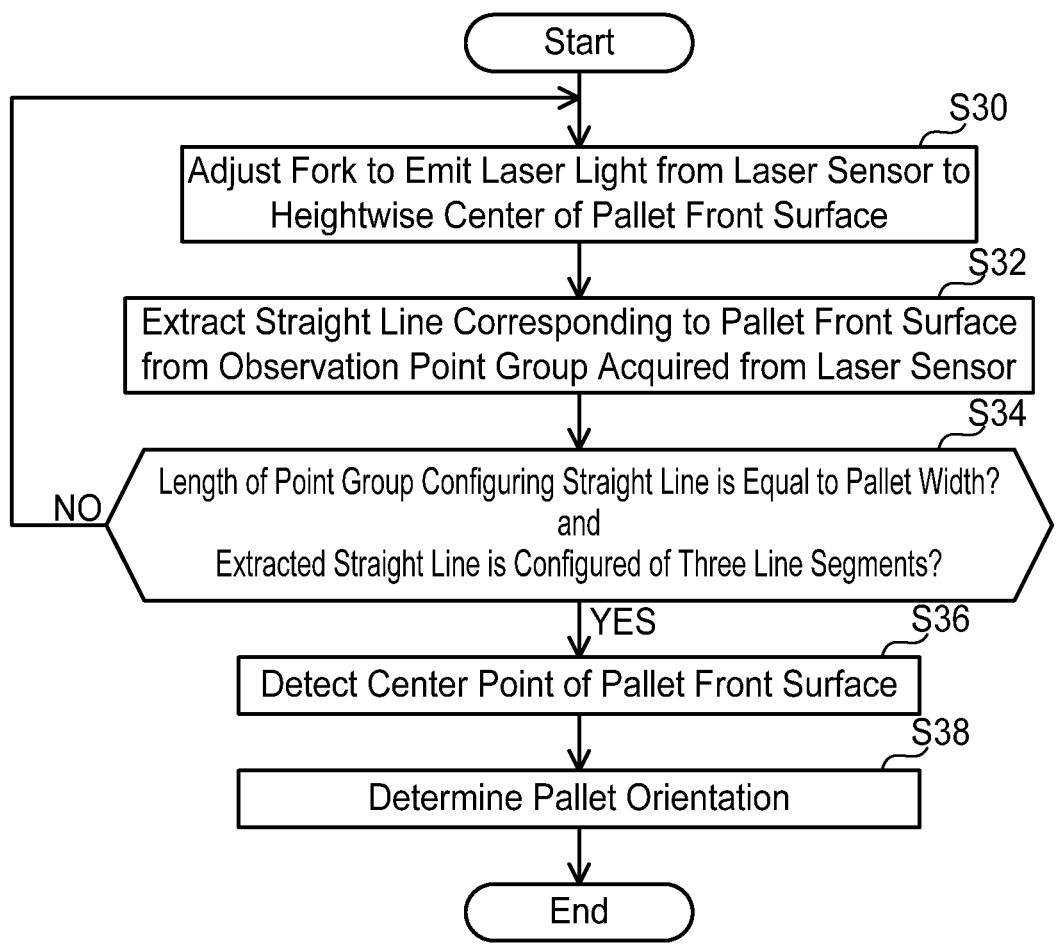
FIG. 8 is a flowchart showing procedures of a process of identifying a center point and an orientation of a front surface of the pallet based on the distance data acquired by the laser sensor upon when the forklift moves from the initial position to a loading position.

Next, a process that is performed by the controller 70 upon moving the forklift 10 from the initial position to the loading position will be described. Upon moving the forklift 10 from the initial position to the loading position, the controller 70 performs a process of detecting a center point of the front surface of the pallet 100 shown in FIG. 8 and a travel control process of the forklift 10 shown in FIG. 10. That is, the controller 70 detects the center point of the front surface of the pallet 100 using the laser sensor 20 and controls the wheel driving motor 90 and the steering device 94 using the detection result thereof to move the forklift 10 to the loading position. Firstly, the process of detecting the center point of the front surface of the pallet 100 by the controller 70 will be described. As shown in FIG. 8, firstly, the controller 70 adjusts the height of the fork 22 using the fork lifting device 48 based on the pallet height data 62 observed by the laser sensor 20 during a period when the vehicle body 30 moves from the initial position to the loading position, so that the laser light of the laser sensor 20 is constantly emitted to a heightwise center of the front surface of the pallet 100 (S30; such as in a state shown in FIG. 9).

[Math 3]

$$H_s = H_p + L \sin \varnothing \quad (4)$$

Figure 9:
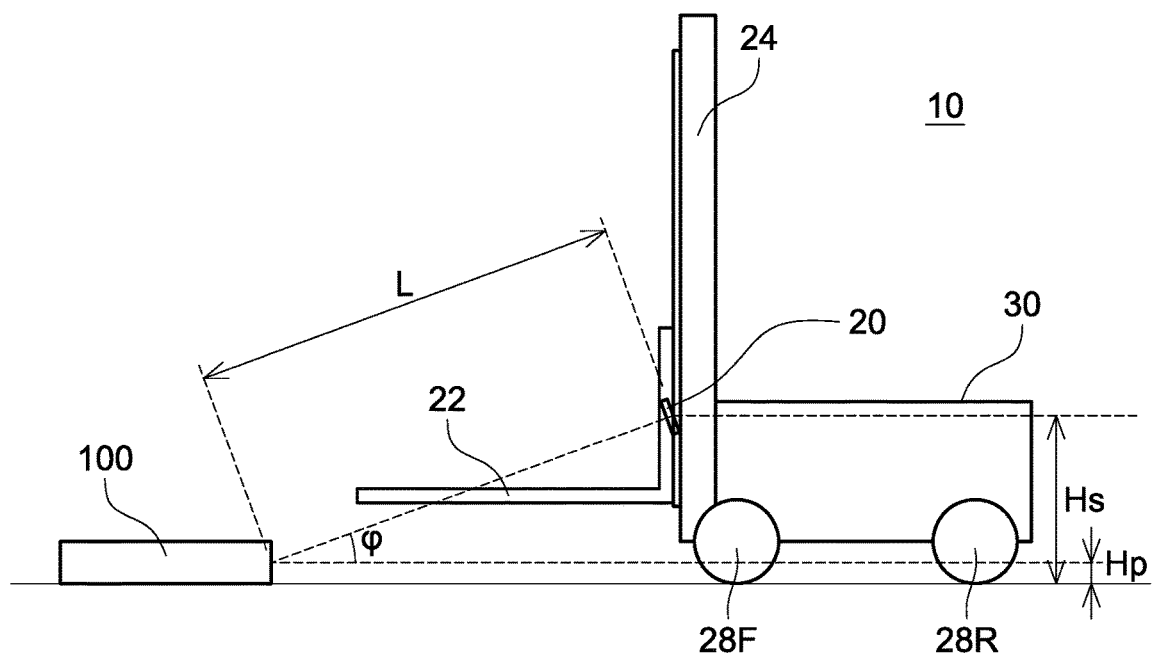
FIG. 9 is a diagram schematically showing a state in which a height of a fork is being controlled to emit laser light onto the front surface of the pallet.

As shown in FIG. 9, a distance L between the laser sensor 20 and the pallet 100 and the pallet height $H_p$ can be calculated using the sensor position detecting unit 46 and the pallet height data 62. Further, a depression angle φ given to the laser sensor 20 is known. Thus, a sensor height $H_s$ can be obtained from the distance L between the laser sensor 20 and the pallet 100, the pallet height $H_p$, and the depression angle φ, and the height of the fork 22 is adjusted based thereon to satisfy the above formula (4). Due to this, the laser light does not deviate off the pallet 100 even if the vehicle body oscillates or measurement errors are generated, and accurate tracking control can be performed.

Next, the controller 70 extracts a straight line corresponding to the front surface of the pallet from the observation point group existing in the target observation region 60 using the laser sensor 20 at the sensor height H (S32). The extraction of such straight lines can be performed using the well-known algorithms such as RANSAC.

Next, the controller 70 performs the process of step S34 on the extracted straight line. Specifically, the controller 70 firstly determines whether or not the length of the point group configuring the straight line extracted in step S32 is substantially equal to the width of the pallet 100 (S34). Here, the length of the point group configuring the straight line can be obtained using the aforementioned formula (1), for example, and by using the observation points having the maximal and minimal values along the x direction and the maximal and minimal values along the y direction within the point group. The controller 70 compares the length obtained by the formula (1) with the width of the pallet 100 (preset value) to determine whether or not it is equal to the width of the pallet 100.

Next, the controller 70 determines whether or not the extracted straight line is configured of three line segments (S34). Specifically, this is same as the process in S16, so the detailed description thereof will be omitted.

In the aforementioned process of step S34, if one or more of the conditions are not met (NO to S34), the controller 70 returns to step S30 and repeats the processes.

Figure 6:
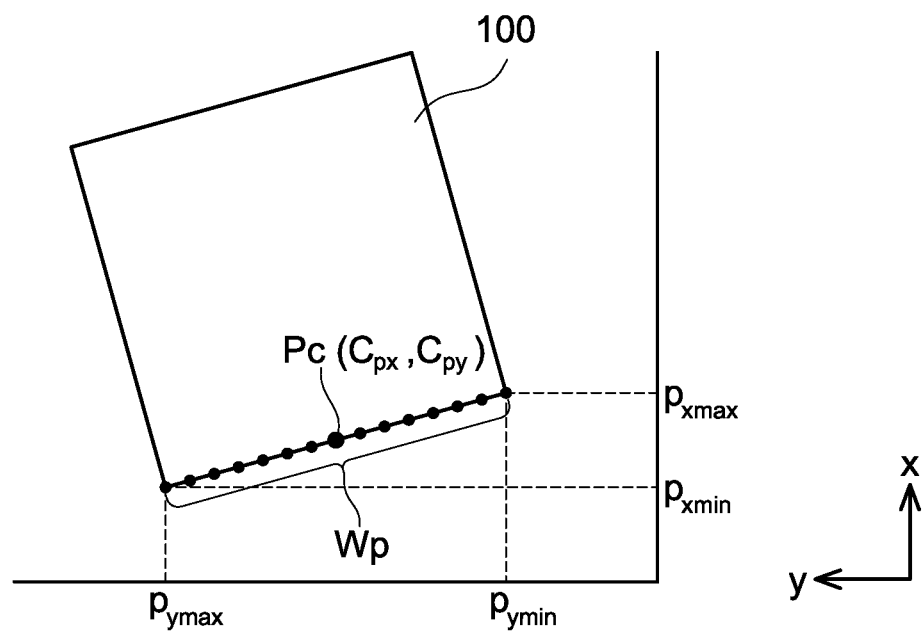
FIG. 6 is a diagram for explaining a method of calculating a length of a point group configuring a straight line extracted from the acquired distance data, and a center point thereof.

If all the conditions in the process of step S34 are met (YES to S34), the controller 70 detects a center point $P_c$ ($C_{px}$, $C_{py}$) of the front surface of the pallet 100 in the x and y directions using the maximal and minimal values along the x direction and the maximal and minimal values along the y direction within the observation point group as acquired by the laser sensor 20 (S36, see FIG. 6). The detection of the center point 1P of the front surface of the pallet 100 in the x and y directions can for example be obtained by the following formulas (5) and (6).

[Math 4]

$$C_{px} = \frac{(p_{xmax} + p_{xmin})}{2} \quad (5)$$

$$C_{py} = \frac{(p_{ymax} + p_{ymin})}{2} \quad (6)$$

Next, the controller 70 determines the orientation of the pallet 100 (S38). In the determination on the orientation of the pallet 100, the pallet orientation can be obtained for example by using the pallet identifying unit 36 and the sensor position detecting unit 46, setting an extracted straight line direction as a normal vector of a side surface of the pallet 100, and setting a direction perpendicular to the straight line as a normal vector of the front surface of the pallet 100. Due to this, the position and the orientation of the pallet 100 can be identified, as a result of which pallet position-orientation data 84 that identifies the position and the orientation of the pallet 100 can be acquired. It should be noted that, a function of the controller 70 realized by the processes of steps S30 to S38 as above corresponds to the pallet identifying unit 36 shown in FIG. 3.

Figure 10:
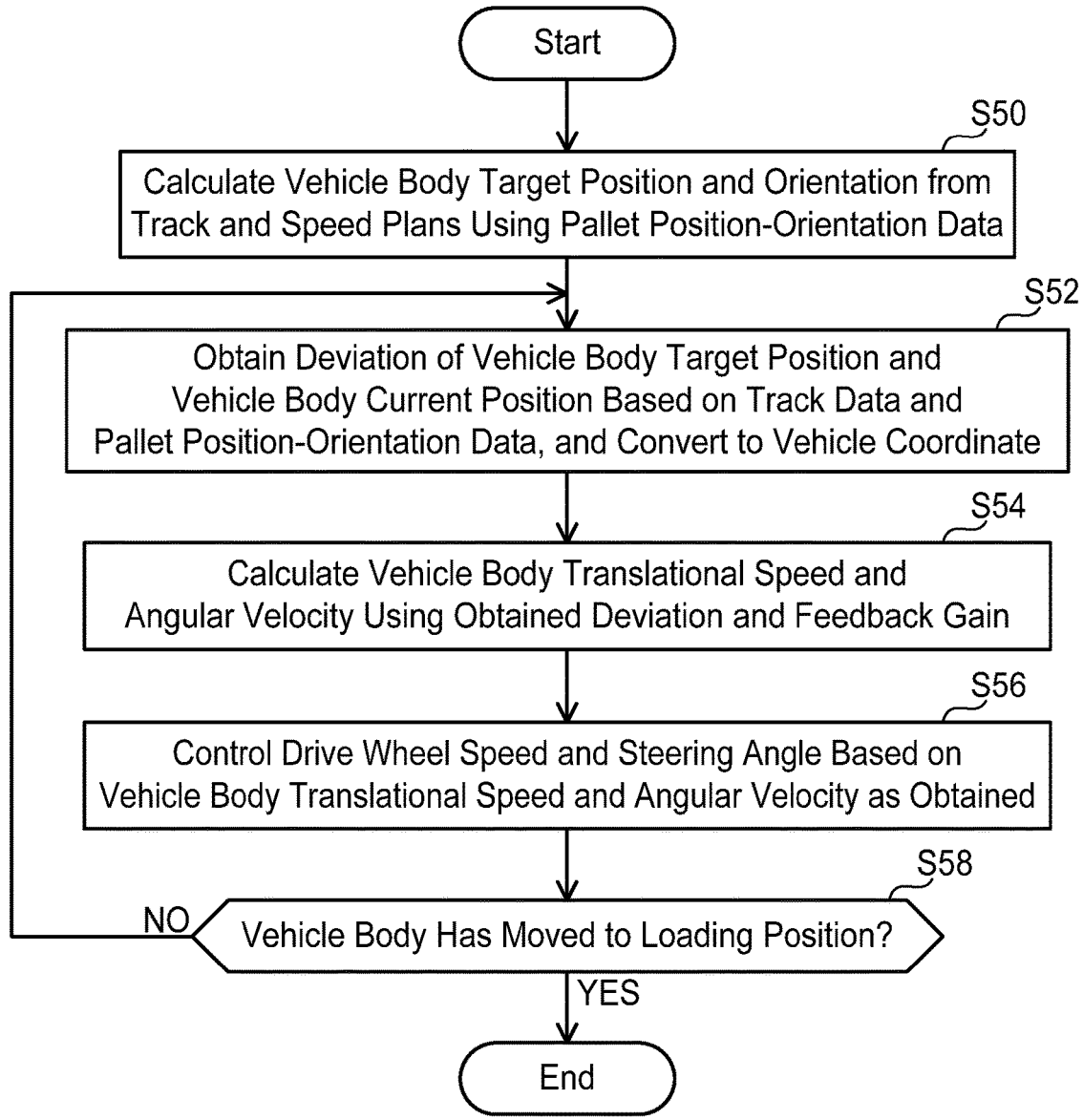
FIG. 10 is a flowchart showing procedures of a process of a forklift moving control when the forklift is to be moved to the loading position.

Next, the travel control process of the forklift 10 by the controller 70 will be described with reference to FIG. 10. As shown in FIG. 10, the controller 70 generates a track plan for moving the vehicle body 30 to the loading position of the pallet 100 (a final target position and a final target orientation thereof) based on the pallet position-orientation data 84 acquired by performing the processes shown in FIG. 4, and calculates target positions and target orientations for respective timings in a period for moving from the current position (initial position) to the loading position based on the generated track plan (S50). Specifically, firstly the controller 70 determines the loading position of the pallet 100 (the final target position and the final target orientation of the forklift 10) and a time period required for moving from the current position to the loading position based on the pallet position-orientation data 84, and generates a track plan and a speed plan therefrom. Then, based on the generated track and speed plans, the controller 70 calculates the target positions and the target orientations (track data 86) for the respective timings from a current point in time during the period for moving to the loading position. Conventional and well-known methods such as linear interpolation and splined curve interpolation may be used for the track and speed plans. It should be noted that, a function of the controller 70 realized by the aforementioned processes corresponds to the track and speed planning unit 38 shown in FIG. 3.

Next, the controller 70 generates control command values for moving the vehicle body 30 to the loading position (the final target position and the final target orientation) based on the determined track data 86 (the target positions and the target orientations at the respective timings) and the current position of the forklift 10 identified from the pallet position-orientation data 84 acquired by the processes shown in FIG. 8. That is, in the present embodiment, the observation of the pallet 100 by the laser sensor 20 (the processes of FIG. 8) is performed during the movement of the forklift 10 from the initial position to the loading position. Due to this, the current position (relative position with respect to the pallet 100) and orientation of the forklift can be calculated from the pallet position-orientation data 84 acquired by the laser sensor 20. Due to this, as shown in the formula (7), the controller 70 firstly calculates a deviation $x_e$, $y_e$, $\theta_e$ from the target position and orientation $x_{ref}$, $y_{ref}$, $\theta_{ref}$ of the vehicle body 30 at current point of time based on the track data 86 and the current position and orientation $x_{veh}$, $y_{veh}$, $\theta_{veh}$ the vehicle body 30 calculated from the pallet position-orientation data 84, and converts the calculated deviation $x_e$, $y_e$, $\theta_e$ into a vehicle coordinate (S52).

[Math 5]

$$\begin{pmatrix} x_e \\ y_e \\ z_e \end{pmatrix} = \begin{pmatrix} \cos\theta_{veh} & \sin\theta_{veh} & 0 \\ -\sin\theta_{veh} & \cos\theta_{veh} & 0 \\ 0 & 0 & 1 \end{pmatrix} \begin{pmatrix} x_{ref} - x_{veh} \\ y_{ref} - y_{veh} \\ \theta_{ref} - \theta_{veh} \end{pmatrix} \quad (7)$$

Figure 11:
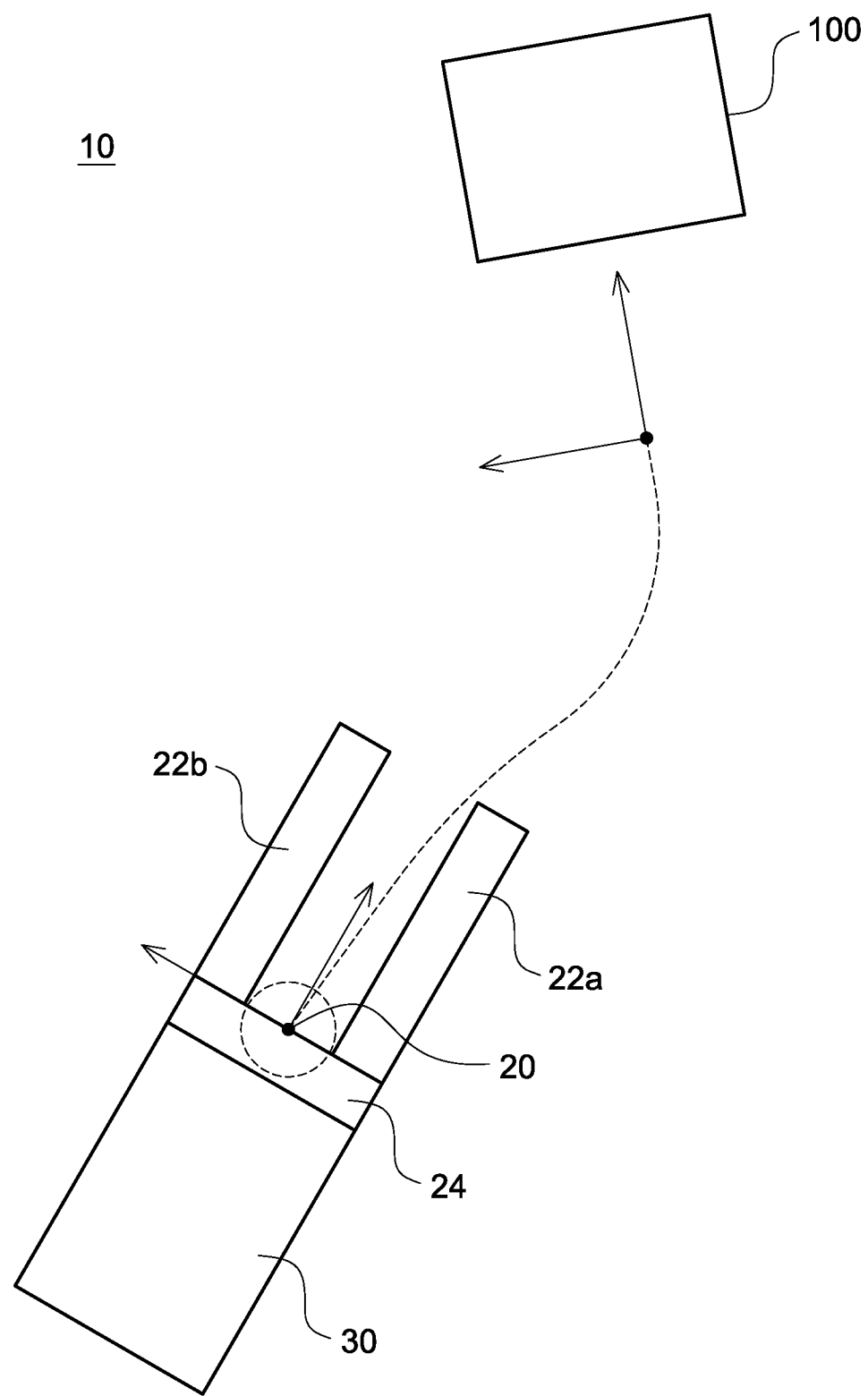
FIG. 11 is a diagram schematically showing a moving state of the forklift upon performing the process to move the forklift to the loading position.

Next, the controller 70 multiplies the deviation obtained from the above formula (7) by a feedback gain $K_x$, $K_y$, $K_\theta$ to calculate actual target translational speed $v_{out}$ and target angular velocity $\omega_{out}$ the vehicle body 30 should be implementing (driving-steering data 88) (S54). It should be noted that, the target translational speed $v_{out}$ and target angular velocity $\omega_{out}$ of the vehicle body 30 (that is, the translational speed and angular velocity in a vehicle coordinate system) can be calculated using the following formulas (8) and (9). Further, as shown in FIG. 11, the forklift 10 is adjusted to be at appropriate position and orientation with respect to the pallet 100 by the forklift 10 moving according to the driving-steering data 88. It should be noted that, a function of the controller 70 realized by the above processes corresponds to the drive and steer commanding unit 40 shown in FIG. 3.

[Math 6]

$$v_{out} = v_{ref} \cos\theta_s + K_x x_e \quad (8)$$

$$\omega_{out} = \omega_{ref} + K_y y_e + K_\theta \sin\theta_e \quad (9)$$

Next, the controller 70 controls speed and steering angle of the drive wheels based on the obtained translational speed $v_{out}$ and angular velocity $\omega_{out}$ (S56). That is, the controller 70 calculates a drive wheel speed command value and a steering angle command value for realizing this operation using geometric calculation based on the control command values ($v_{out}$, $\omega_{out}$), and outputs the same to the wheel driving motor 90 and the steering device 94, respectively. It should be noted that, a function of the controller 70 realized by the above processes corresponds to the drive wheel and steer controlling unit 42 shown in FIG. 3.

Next, the controller 70 determines whether or not the forklift 10 has moved to the loading position (the final target position and the final target orientation) (S58). If it is determined that the forklift 10 had not yet moved to the loading position (NO to S58), the controller 70 repeats steps S52 to S58. Due to this, the forklift 10 moves to the loading position. On the other hand, if it is determined that the forklift 10 has moved to the loading position (YES to S58), the process shown in FIG. 10 is completed.

In the forklift 10 of the aforementioned embodiment, the laser sensor 20 is mounted to the fork 22. Due to this, the laser sensor 20 moves up and down as the fork 22 moves up and down. As such, a profile of the front surface of the pallet 100 can be measured simply by allowing the laser sensor 20 to scan the laser light in the horizontal direction while moving the fork 22 up and down. Further, since the position, orientation, and width of the pallet 100 are identified using the observation point group on the front surface of the pallet 100, a positional displacement in a lateral direction and a displacement related to rotation of the pallet 100 can be detected.

Further, in the forklift 10 of the aforementioned embodiment, the track data for moving the vehicle body 30 to the loading position of the pallet 100 is generated based on the measurement data of the pallet 100 as acquired by the laser sensor 20, and the vehicle body 30 is moved using the generated track data. Due to this, the forklift 10 can accurately be positioned at the loading position of the pallet 100.

Finally, corresponding relationship between the aforementioned embodiment and the claims will be described. The drive wheel and steer controlling unit 42 is an example of a "controller" in the claims, the pallet identifying unit 36, the track and speed planning unit 38, and the drive and steer commanding unit 40 is an example of a "control commander", and the sensor moving controlling unit 44 is an example of a "lift mechanism".

The embodiments have been described in detail, however, these are mere exemplary indications and thus do not limit the scope of the claims. The art described in the claims include modifications and variations of the specific examples presented above.

Figure 12:
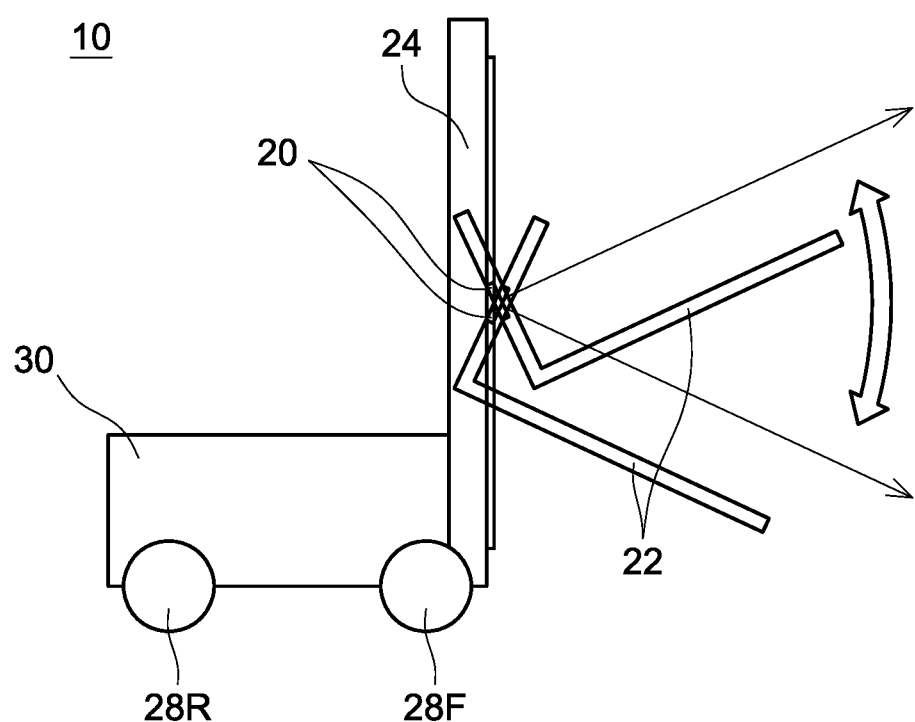
FIG. 12 is a diagram schematically showing a state in which the laser light is scanned using a tilting mechanism configured to tilt the fork.

For example, in the present embodiment, the laser light is scanned in the up and down direction by moving the fork up and down in the up and down direction, however, the technique disclosed herein is not limited to this configuration. For example, as shown in FIG. 12, the laser light emitted from the laser sensor 20 may be scanned in the up and down direction by using a tilting mechanism that tilts a distal end of the fork with respect to its proximal end.

Figure 13:
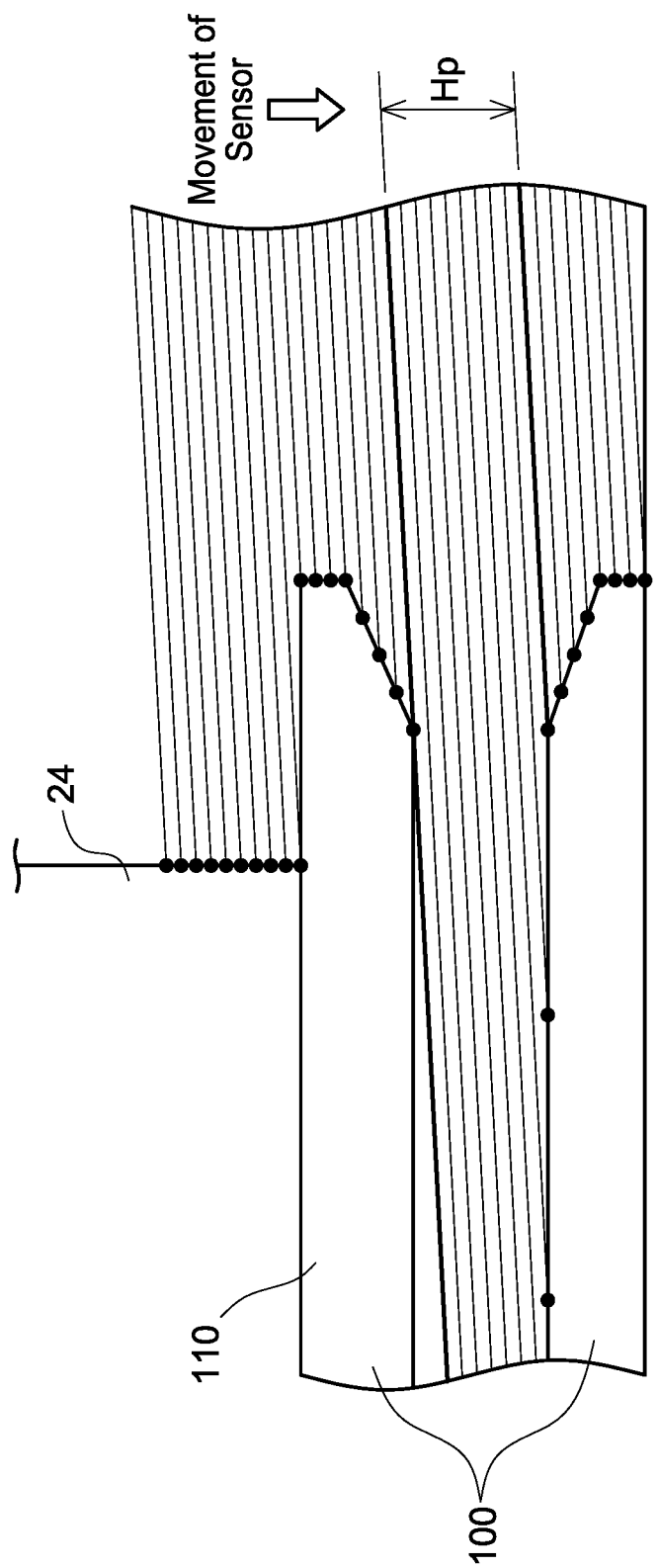
FIG. 13 is a diagram for explaining a method of detecting a height of the pallet.

Further, in the present embodiment, a straight line extending in the horizontal direction is extracted from the observation point group acquired using the laser sensor 20, takes the length of the line segments thereof and a number of the line segments (number of clusters) as features of the openings 110 of the pallet 100, and detects the height of the pallet 100 based thereon, however, the technique disclosed herein may detect the height, of the pallet 100 by measuring changes in a beam length of the laser light emitted from the laser sensor 20. For example, when the laser light emitted from the laser sensor 20 is scanned from the upper limit to the lower limit of the target observation region 60, the beam length of the laser light emitted from the laser sensor 20 changes greatly due to existence of the openings 110 as shown in FIG. 13. Due to this, the height of the pallet 100 (the heightwise position of the openings 110) can be detected according to the changes in the beam length of the laser light. Specifically, a portion where the beam length has significantly increased can be determined as the upper end of the openings 110 of the pallet, and a portion where the beam length has significantly decreased can be determined as the lower end of the openings 110 of the pallet. More specifically, when the laser scanning is performed from the upper limit of the target observation region 60 downward, the laser light firstly observes an upper end of the pallet 100. As the laser scanning further progresses, when the height of the emitted laser light reaches the openings 110, the emitted laser light passes through the openings 110, and a position where the beam length of the laser light becomes significantly long thereby appears. Accordingly, this height can be identified as the upper ends of the openings 110. Thereafter, the laser scanning is further continued, and when the height of the emitted laser light reaches the lower ends of the openings 110, the laser light is emitted onto the front surface of the pallet 100, and the beam length of the laser light becomes significantly short. Accordingly, this height can be identified as the lower ends of the openings 110. It should be noted that, if the specification of the pallet (size of the openings 110) is known, the detection of the upper end or the lower end position of the openings 110 enables to calculate the height of the center portions of the openings 110 of the pallet. In such a case, the laser light does not need to be scanned to the lower limit of the target observation region 60, and a lead time can be shortened. It should be noted that, the detection of the height of the pallet 100 can perform the laser scanning from the lower limit of the target observation region 60 upward.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A forklift comprising:
    a vehicle body;
    a fork mounted on the vehicle body;
    a controller configured to adjust a position and an orientation of the vehicle body;
    a laser sensor configured to measure distance data from the laser sensor to an object existing in a space set forward of the fork;
    a control commander configured to, when the distance data measured by the laser sensor includes a pallet to be lifted, generate track data for moving the vehicle body to a loading position of the pallet based on the distance data, and provide a command to the controller using the generated track data; and
    a lift mechanism configured to move the fork up and down with respect to the vehicle body,
    wherein
    the laser sensor is configured to measure a distance from the laser sensor to an object in a scanning plane by scanning laser light in a first direction,
    the laser sensor is mounted on the fork and is configured to measure three-dimensional distance data from the laser sensor to the object existing in the space set forward of the fork by using an up and down motion of the fork by the lift mechanism in a direction which is different from the first direction, and
    the control commander is configured to execute following processes:
    (a) acquiring an observation point group from the distance data acquired from the laser sensor;

(b) determining whether or not a point group constituting a straight line can be extracted from the observation point group;
(c) determining whether or not a length of the point group constituting the straight line is substantially equal to a width of the pallet; and
(d) determining whether or not the straight line is constituted of three line segments, such that the control commander identifies a position and an orientation of the pallet based on the distance data, and generates the track data based on the identified position and orientation of the pallet.

2. The forklift according to claim 1, further comprising:
a tilting mechanism configured to tilt the fork with respect to the vehicle body,
wherein
the laser sensor is configured to measure the three-dimensional distance data from the laser sensor to the object existing in the space set forward of the fork by using a tilting motion of the fork.

3. The forklift according to claim 1, wherein
the laser sensor is disposed above a lower surface of the fork.

4. The forklift according to claim 3, wherein
the laser sensor is mounted on the fork with a depression angle with respect to a horizontal direction so that the laser light emitted from the laser sensor is emitted obliquely downward.

5. The forklift according to claim 1, wherein
when the three-dimensional distance data measured by the laser sensor includes the load or the pallet to be lifted, the control commander is configured to control a motion of the fork so that the laser light emitted from the laser sensor is emitted to a heightwise center of a front surface of the load or the pallet while the vehicle body is moved to the loading position of the load or the pallet based on the three-dimensional distance data.

* * * * *